US009073641B2

(12) United States Patent
Cook et al.

(10) Patent No.: US 9,073,641 B2
(45) Date of Patent: Jul. 7, 2015

(54) AIRCRAFT INTERIOR LAVATORY

(71) Applicant: B/E Aerospace, Inc., Wellington, FL (US)

(72) Inventors: Donald F. Cook, Arlington, WA (US);
Liberty Harrington, Seattle, WA (US);
Philipp Steiner, Seattle, WA (US);
Robert K. Brauer, Seattle, WA (US);
Trevor Skelly, Mercer Island, WA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/043,500

(22) Filed: Oct. 1, 2013

(65) Prior Publication Data

US 2014/0158825 A1 Jun. 12, 2014

Related U.S. Application Data

(63) Continuation of application No. 13/089,063, filed on Apr. 18, 2011, now Pat. No. 8,590,838.

(60) Provisional application No. 61/346,835, filed on May 20, 2010, provisional application No. 61/326,198, filed on Apr. 20, 2010.

(51) Int. Cl.
*B64D 11/06* (2006.01)
*B64D 11/02* (2006.01)
*B64C 1/10* (2006.01)

(52) U.S. Cl.
CPC . *B64D 11/02* (2013.01); *B64C 1/10* (2013.01); *Y02T 50/46* (2013.01)

(58) Field of Classification Search
CPC ........... B64D 11/00; B64D 2011/0046; B64D 11/0023; B64D 11/06; B64D 2011/0617; B64D 2011/0665; B63B 11/00; B63B 11/02; B63B 29/00; B63B 29/02; E47K 3/00; E47K 11/00
USPC ............. 244/1 R, 118.5, 118.6, 129.1, 117 R; 114/116
See application file for complete search history.

(56) References Cited

U.S. PATENT DOCUMENTS 2,650,368 A 9/1953 Evans
2,760,443 A * 8/1956 Gobrecht ...................... 105/315
(Continued)

FOREIGN PATENT DOCUMENTS

EP 1281614 A1 3/2005
WO 03026495 A2 4/2003
(Continued)

OTHER PUBLICATIONS

EPO, International Search Report and Written Opinion for PCT international Application No. PCT/US2011/033090 dated Sep. 15, 2011.

(Continued)

*Primary Examiner* — Benjamin P Lee
(74) *Attorney, Agent, or Firm* — Fulwider Patton LLP

(57) ABSTRACT

A lavatory for an aircraft cabin includes a wall having a forward wall portion disposed immediately aft of and substantially conforming to an exterior aft surface of an aircraft cabin structure, such as a passenger seat, that is substantially not flat in a vertical plane. The forward wall portion includes a forward projection over an aft portion of the adjacent passenger seat. The forward wall portion can define a secondary space in the interior lavatory space, which can provide an amenity stowage space, and can include design elements providing visual space.

17 Claims, 1 Drawing Sheet

(56) References Cited

U.S. PATENT DOCUMENTS

| | | | |
|---|---|---|---|
| 2,914,001 A * | 11/1959 | Murphy | 105/315 |
| 3,738,497 A | 6/1973 | Betts et al. | |
| 4,055,317 A | 10/1977 | Greiss | |
| 4,884,767 A | 12/1989 | Shibata | |
| 5,150,863 A | 9/1992 | Hozumi et al. | |
| 5,333,416 A | 8/1994 | Harris et al. | |
| 5,340,059 A | 8/1994 | Kanigowski | |
| 5,482,230 A | 1/1996 | Bird et al. | |
| 5,529,265 A | 6/1996 | Sakurai | |
| 5,577,358 A | 11/1996 | Franke | |
| 5,716,026 A * | 2/1998 | Pascasio et al. | 244/118.6 |
| 6,079,669 A | 6/2000 | Hanay et al. | |
| 6,615,421 B2 | 9/2003 | Itakura | |
| 6,889,936 B1 | 5/2005 | Pho et al. | |
| 7,222,820 B2 | 5/2007 | Wentland et al. | |
| 7,284,287 B2 * | 10/2007 | Cooper et al. | 4/664 |
| 7,448,575 B2 * | 11/2008 | Cheung et al. | 244/118.6 |
| 7,934,679 B2 | 5/2011 | Bock et al. | |
| 8,096,502 B2 | 1/2012 | Bock et al. | |
| 8,109,469 B2 | 2/2012 | Breuer et al. | |
| 8,162,258 B2 | 4/2012 | Joannis et al. | |
| 8,167,244 B2 | 5/2012 | Johnson et al. | |
| 8,177,163 B2 | 5/2012 | Wilcynski et al. | |
| 2006/0192050 A1 | 8/2006 | Cheung et al. | |
| 2007/0164157 A1 * | 7/2007 | Park | 244/118.6 |
| 2007/0170310 A1 | 7/2007 | Bock et al. | |
| 2007/0241232 A1 | 10/2007 | Thompson | |
| 2007/0295863 A1 | 12/2007 | Thompson | |
| 2009/0050738 A1 | 2/2009 | Breuer | |
| 2009/0065642 A1 | 3/2009 | Cheung et al. | |
| 2009/0200422 A1 | 8/2009 | Johnson | |
| 2009/0255437 A1 | 10/2009 | Hatchet | |
| 2010/0059625 A1 | 3/2010 | Saint-Jalmes et al. | |
| 2010/0181425 A1 | 7/2010 | Guering et al. | |
| 2011/0121134 A1 | 5/2011 | Schotte et al. | |
| 2011/0139930 A1 | 6/2011 | Sutthoff et al. | |
| 2011/0210205 A1 | 9/2011 | Bock et al. | |
| 2012/0112505 A1 | 5/2012 | Breuer et al. | |
| 2012/0273614 A1 | 11/2012 | Ehlers et al. | |
| 2012/0325964 A1 | 12/2012 | Hawkins et al. | |
| 2013/0206906 A1 | 8/2013 | Burrows et al. | |
| 2014/0014774 A1 | 1/2014 | Pozzi et al. | |
| 2014/0027572 A1 | 1/2014 | Ehlers et al. | |

FOREIGN PATENT DOCUMENTS

| | | |
|---|---|---|
| WO | 2005014395 A1 | 2/2005 |
| WO | 2005080196 A1 | 9/2005 |
| WO | 2007006938 A1 | 1/2007 |

OTHER PUBLICATIONS

McDonnell Douglas, DC-10 Customer Configuration, Oct. 1978, 177 pages.

C&D Zodiac, Inc.'s proposal to Scandinavian Airlines System to manufacture S4 Storage Unit, Aug. 23, 2001, 17 pages.

C&D Zodiac, Inc.'s drawings with a leading page entitled "MD90," 27 pages.

Photographs of C&D Zodiac, Inc.'s S4 storage unit, 5 pages.

C&D Zodiac, Inc.'s Petition for Inter Partes Review of U.S. Patent No. 8,590,838 (including exhibits/tabs 1-9), May 2, 2014, 856 pages.

Technical Proposal by FSI to Air France regarding a Door 4 overhead crew rest station for the Boeing 747, Aug. 3, 1994, 10 pages.

Rendering and photographs of Boeing 747 overhead crew rest station, 3 pages.

B/E Aerospace, Inc. Motion for Preliminary Injunction, May 16, 2014, 25 pages.

Greg Chamitoff Declaration in support of B/E Aerospace, Inc.'s Motion for Preliminary Injunction, May 14, 2014, 39 pages.

Chinese Search Report, Aug. 5, 2014, 1 page, from Chinese application No. 2011800202050.

* cited by examiner

US 9,073,641 B2

AIRCRAFT INTERIOR LAVATORY

CROSS-REFERENCES TO RELATED APPLICATIONS

This continuation application is based upon U.S. Ser. No. 13/089,063, filed on Apr. 18, 2011, which claims priority from Provisional Application No. 61/326,198, filed Apr. 20, 2010, and Provisional Application No. 61/346,835, filed May 20, 2010, which are incorporated by reference in their entirety herein.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion with a substantially vertically extending exterior aft surface that is substantially not flat in a vertical plane.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent structures to allow an adjacent structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other structures forward.

It would also be desirable to provide an aircraft lavatory or other enclosure with a wall to bear loads from an adjacent passenger seating or other structure, permitting elimination of a required gap between the lavatory or other enclosure and the adjacent passenger seating or other structure, making more space available for other uses. In addition, enabling a lavatory or other enclosure to bear loads from an adjacent structure can reduce the combined weight of the lavatory or other enclosure and the adjacent structure.

It also would be desirable to provide an aircraft lavatory or other enclosure that can reduce or eliminate the gaps and volumes of space previously required between lavatory enclosures and adjacent structures, to allow the installation of an increased number of passenger seats, to increase the value of the aircraft. The present invention meets these and other needs.

SUMMARY OF THE INVENTION

Briefly, and in general terms, the present invention provides for an enclosure, such as a lavatory, an aircraft closet, or an aircraft galley, for example, for a cabin of an aircraft including a structure having an aft portion with a substantially vertically extending exterior aft surface that is substantially not flat in a vertical plane. The enclosure structure permits a combination of the enclosure with the structure in a manner that permits significant saving of space in the aircraft, which in turn permits more seats to be installed, or more space to be offered per seat, increasing the value of the aircraft.

Accordingly, in one presently preferred aspect, the present invention provides for an enclosure unit for a cabin of an aircraft including an aircraft cabin structure having an aft portion with an exterior aft surface that is substantially not flat in a vertical plane. The enclosure unit can be a lavatory, an aircraft closet, or an aircraft galley, for example. In one presently preferred aspect, the enclosure unit includes one or more walls that are taller than an adjacent aircraft cabin structure, the one or more walls defining an interior enclosure space and having a forward wall portion. The forward wall portion is configured to be disposed immediately aft of and adjacent to or abutting the exterior aft surface of the aircraft cabin structure, and the forward wall portion is shaped to substantially conform to the shape of the exterior aft surface of the aircraft cabin structure.

In another presently preferred aspect, the enclosure unit includes an enclosure stall unit, and the aircraft cabin structure is a passenger seat installed immediately forward of the enclosure stall unit. In another presently preferred aspect, the forward wall portion of the enclosure unit is configured to accept loads from the aircraft passenger seat. In another presently preferred aspect, the forward wall portion includes a forward projection configured to project over an aft portion of the adjacent passenger seat immediately forward of the enclosure stall unit.

In another presently preferred aspect, the enclosure is a lavatory, including a lavatory stall unit with one or more walls having a forward wall portion. The one or more walls define an interior lavatory space, and the forward wall portion is configured to be disposed immediately aft of and adjacent to or abutting an aircraft cabin structure having an exterior aft surface having a shape that is substantially not flat in a vertical plane. In a presently preferred aspect, the forward wall portion is shaped to substantially conform to the shape of the exterior aft surface of the aircraft cabin structure.

In another presently preferred aspect, the aircraft cabin structure is a passenger seat installed immediately forward of the lavatory stall unit, and the forward wall portion of the lavatory stall unit is configured to accept loads from the passenger seat. In another presently preferred aspect, the forward wall portion includes a forward projection configured to project over an aft portion of the adjacent passenger seat immediately forward of the lavatory stall unit. In another presently preferred aspect, the forward wall portion defines a secondary space in the interior lavatory space in an area forward of an aft-most portion of the forward wall portion. The secondary space can provide an amenity stowage space inside the lavatory stall unit in the area forward of an aft-most portion of the forward wall portion, and can include design elements providing visual space inside the lavatory in the area forward of an aft-most portion of the forward wall portion.

In another presently preferred aspect, the present invention provides for an assembly of an aircraft enclosure unit and an aircraft cabin structure for an aircraft cabin, the assembly in combination including an aircraft cabin structure having an exterior aft surface having a shape that is substantially not flat in a vertical plane, and an aircraft enclosure unit including at least one wall having a forward wall portion. The one or more walls define an interior enclosure space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft enclosure unit. In another presently preferred aspect, the forward wall portion is configured to accept loads from the aircraft passenger seat. In another presently preferred aspect, the forward wall portion includes a forward projection configured to project over an aft portion of the adjacent passenger seat immediately forward of the aircraft enclosure unit.

In another presently preferred aspect, the aircraft enclosure unit is a lavatory stall, and the one or more walls define an interior lavatory space. In another presently preferred aspect, the forward wall portion defines a secondary space in the interior lavatory space in an area forward of an aft-most portion of the forward wall portion.

In another presently preferred aspect, the present invention provides for an assembly of an aircraft lavatory unit and an aircraft cabin structure for an aircraft cabin, in which the assembly in combination includes an aircraft cabin structure having an exterior aft surface having a shape that is substantially not flat in a vertical plane, and an aircraft lavatory stall unit including one or more walls having a forward wall portion. In another presently preferred aspect, the one or more walls define an interior lavatory space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft lavatory stall unit, and wherein the forward wall portion of the aircraft lavatory stall unit is configured to accept loads from the passenger seat. In another presently preferred aspect, the forward wall portion includes a forward projection configured to project over an aft portion of the adjacent passenger seat immediately forward of the aircraft lavatory stall unit. In another presently preferred aspect, the forward wall portion defines a secondary space in the interior lavatory space in an area forward of an aft-most portion of the forward wall portion.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
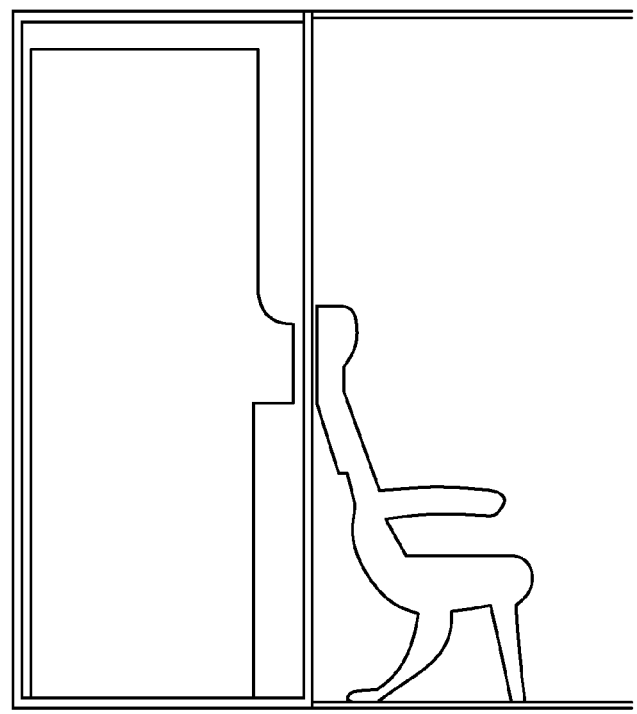
FIG. 1 is a schematic diagram of a prior art installation of a lavatory immediately aft of and adjacent to an aircraft passenger seat.
Figure 2:
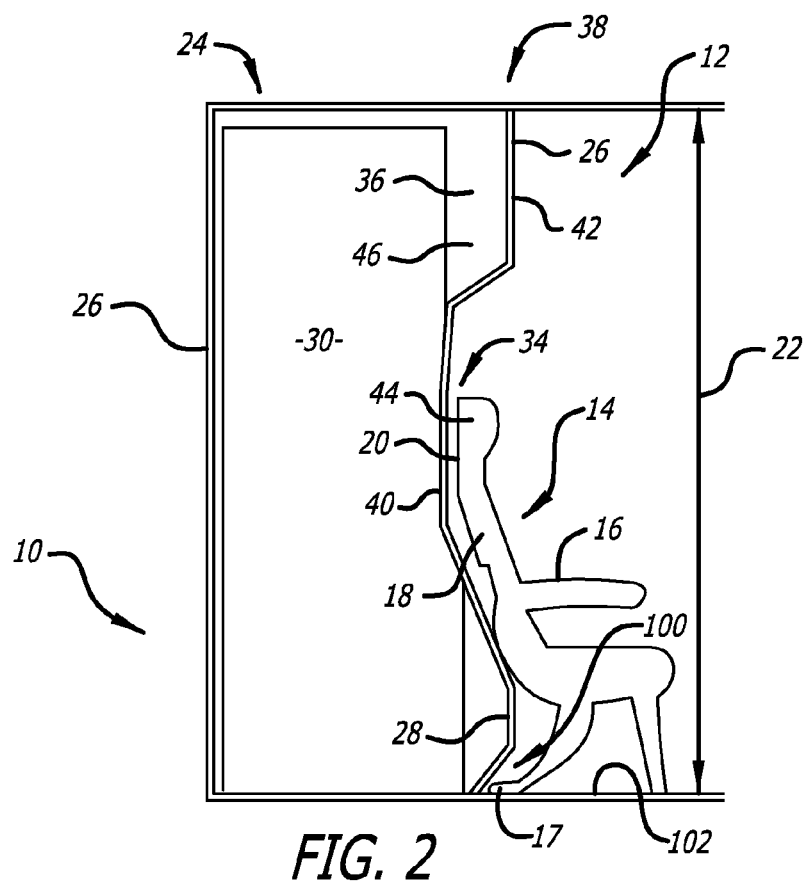
FIG. 2 is a schematic diagram of an installation of a lavatory according to the present invention immediately aft of and adjacent to or abutting an aircraft cabin passenger seat.

Referring to the drawings, which are provided by way of example, and not by way of limitation, the present invention provides for an enclosure 10, such as a lavatory for a cabin 12 of an aircraft (not shown), although the enclosure may also be an aircraft closet, or an aircraft galley, or similar enclosed or structurally defined spaces, for example. As is illustrated in FIG. 2, the cabin includes a structure 14, and the enclosure may be taller than the cabin structure. The cabin structure can be a passenger seat 16, for example, installed immediately forward of the enclosure and having an aft portion 18 with and exterior aft surface 20 that is substantially not flat in a vertical plane 22. The lavatory includes a lavatory stall unit 24 having one or more walls 26 having a forward wall portion 28. The one or more walls define an interior lavatory space 30, and the forward wall portion is configured to be disposed immediately aft of and adjacent to or abutting the exterior aft surface of the aircraft cabin structure. The forward wall portion has a shape that is substantially not flat in the vertical plane, and preferably is shaped to include a recess 34 such that the forward wall portion substantially conforms to the shape of the exterior aft surface of the aircraft cabin structure. In a presently preferred aspect, the forward wall portion of the lavatory stall unit is configured to accept loads from the passenger seat. As shown in FIG. 2, the forward wall portion 28 can be configured to provide a lower recess 100 formed between the forward wall portion 28 and the cabin deck 102. As also shown in FIG. 2, the lower recess 100 can be configured to receive at least a portion of an aft-extending seat support 17 therein. As can be seen by comparing FIG. 1 and FIG. 2, the recess 34 and the lower recess 100 combine to permit the passenger seat 16 to be positioned farther aft in the cabin than would be possible if the lavatory enclosure 10 included a conventional flat and vertical forward wall without recesses like that shown in FIG. 1, or included a forward wall that did not include both recesses 34, 100.

In another presently preferred aspect, the forward wall portion defines a secondary space 36 in the interior lavatory space in an area 38 forward of an aft-most portion 40 of the forward wall portion, and the forward wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward wall portion, and the secondary space can include design elements providing visual space, such as a visual perception of space, inside the lavatory in the area forward of an aft-most portion of the forward wall portion.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. An aircraft lavatory for a cabin of an aircraft of a type that includes a forward-facing passenger seat that includes an upwardly and aftwardly inclined seat back and an aft-extending seat support disposed below the seat back, the lavatory comprising:

a lavatory unit including a forward wall portion and defining an enclosed interior lavatory space, said forward wall portion configured to be disposed proximate to and aft of the passenger seat and including an exterior surface having a shape that is substantially not flat in a vertical plane; and wherein said forward wall portion is shaped to substantially conform to the shape of the upwardly and aftwardly inclined seat back of the passenger seat, and includes a first recess configured to receive at least a portion of the upwardly and aftwardly inclined seat back of the passenger seat therein, and further includes a second recess configured to receive at least a portion of the aft-extending seat support therein when at least a portion of the upwardly and aftwardly inclined seat back of the passenger seat is received within the first recess.

2. The aircraft lavatory of claim 1, wherein said forward wall portion is configured to accept loads from the passenger seat back.

3. The aircraft lavatory of claim 1, wherein said forward wall portion further includes a projection configured to project over the passenger seat back when at least a portion of the upwardly and aftwardly inclined seat back of the passenger seat is received within the first recess and at least a portion of the aft-extending seat support is received within the second recess.

4. The aircraft lavatory of claim 1, wherein said lavatory unit is taller than the passenger seat.

5. The aircraft lavatory of claim 1, wherein said forward wall portion includes a lower portion that is disposed under the passenger seat back when at least a portion of the upwardly and aftwardly inclined seat back of the passenger seat is received within the first recess and at least a portion of the aft-extending seat support is received within the second recess.

6. The aircraft lavatory of claim 1, wherein said first recess in said forward wall portion is disposed between an upper wall portion and a lower wall portion.

7. The aircraft lavatory of claim 1, wherein said forward wall portion defines a secondary space in said interior lavatory space above the passenger seat back.

8. An aircraft lavatory for an aircraft, the lavatory comprising:
a forward partition;
an aft partition; and
a lavatory space disposed between the forward partition and the aft partition;

wherein the forward partition comprises:
a forward-extending upper portion;
an aft-extending mid-portion; and
a forward-extending lower portion; and
wherein the forward-extending upper portion, the aft-extending mid-portion, and the forward-extending lower portion combine to define a first aft-extending recess disposed between the upper forward-extending portion and the forward-extending lower portion, and
wherein the forward partition further defines a second aft-extending recess proximate to a lower end of the forward partition, the second aft-extending recess being configured to receive at least a portion of an aft-extending seat support of a forward-positioned passenger seat therein.

9. The aircraft lavatory according to claim 8 wherein the first aft extending recess defined by the forward-extending upper portion, the aft-extending mid-portion, and the forward-extending lower portion of the forward partition is configured to receive an aft-extending seat back of the forward-positioned passenger seat.

10. The aircraft lavatory according to claim 9 wherein said forward-extending upper portion is configured to project over at least a portion of the forward-positioned passenger seat.

11. The aircraft lavatory according to claim 9 wherein said forward partition is configured to accept loads from the forward-positioned passenger seat.

12. The aircraft lavatory according to claim 9 wherein said lavatory is taller than the forward-positioned passenger seat.

13. The aircraft lavatory according to claim 8 wherein the aft partition is substantially vertical and substantially planar.

14. The aircraft lavatory according to claim 8 wherein the width of the lavatory space disposed between the forward partition and the aft partition comprises an upper width, a lower width, and a mid-width, and wherein the upper width and the lower width are both substantially wider than the mid-width.

15. The aircraft lavatory according to claim 8 wherein the upper forward-extending portion, the aft-extending mid-portion, and the forward-extending lower portion of the forward partition form a substantially continuous surface.

16. The aircraft lavatory according to claim 8 wherein said first aft-extending recess extends along substantially a full width of said forward partition.

17. The aircraft lavatory according to claim 8 wherein said lavatory has a top, a bottom, a height therebetween, and a middle therebetween, said lavatory has varying lengths along the height of the lavatory, and said lavatory is longer at the top of the lavatory than at the bottom of the lavatory.

* * * * *